United States Patent Office 3,538,543
Patented Nov. 10, 1970

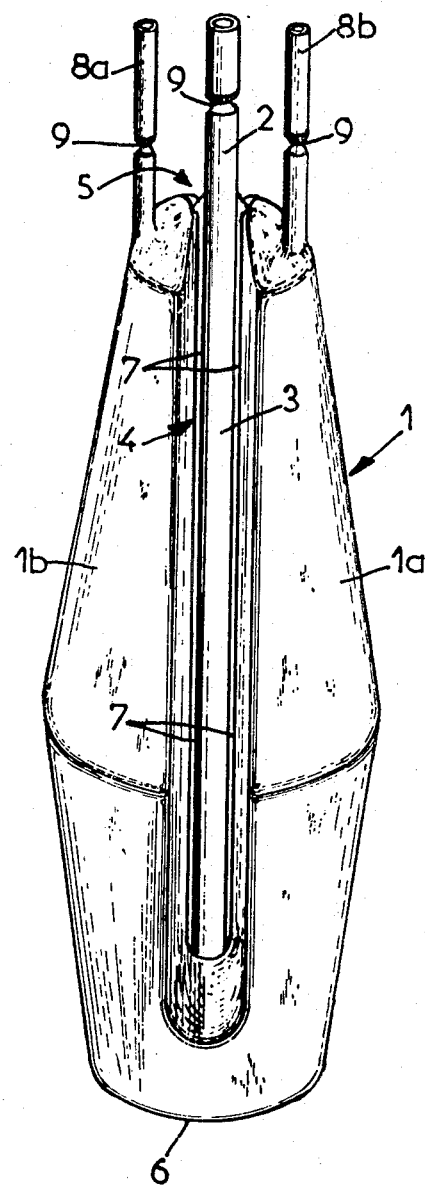

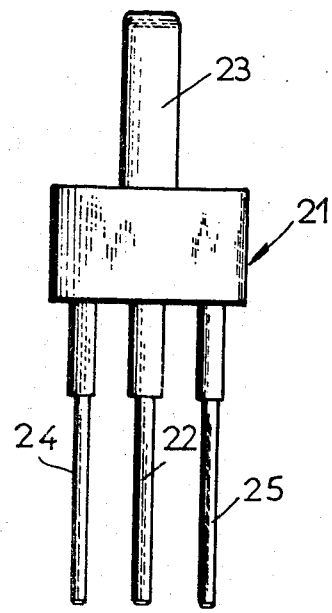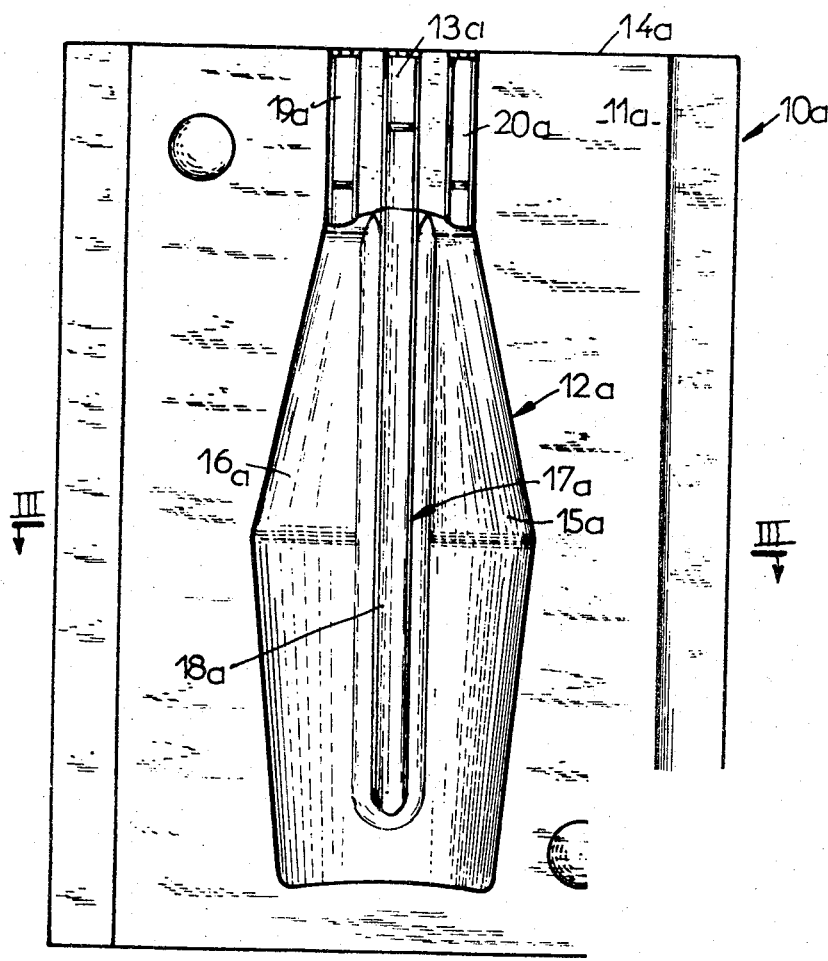

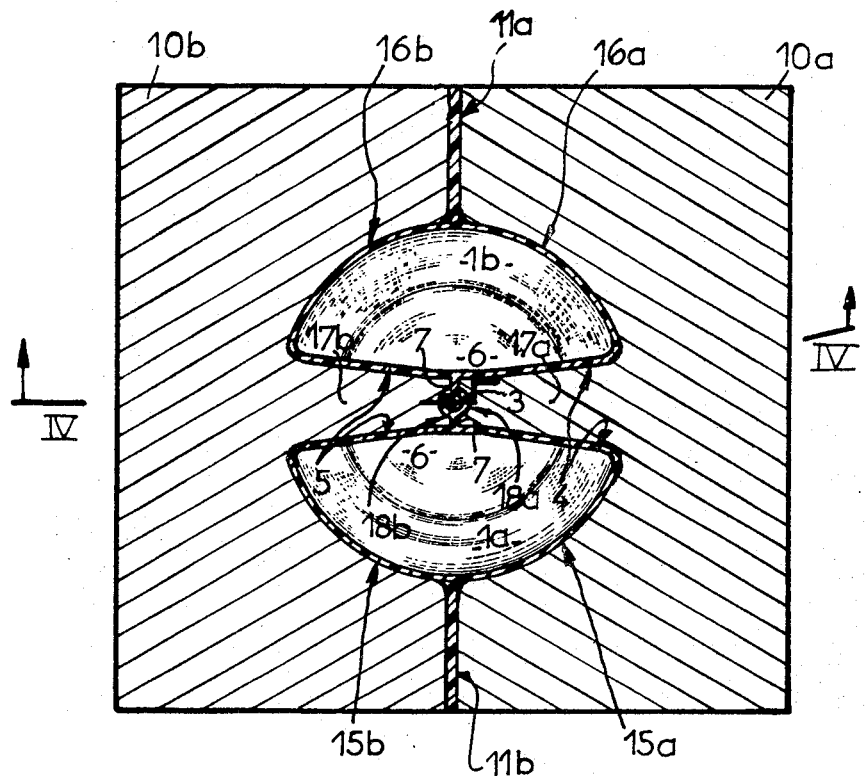

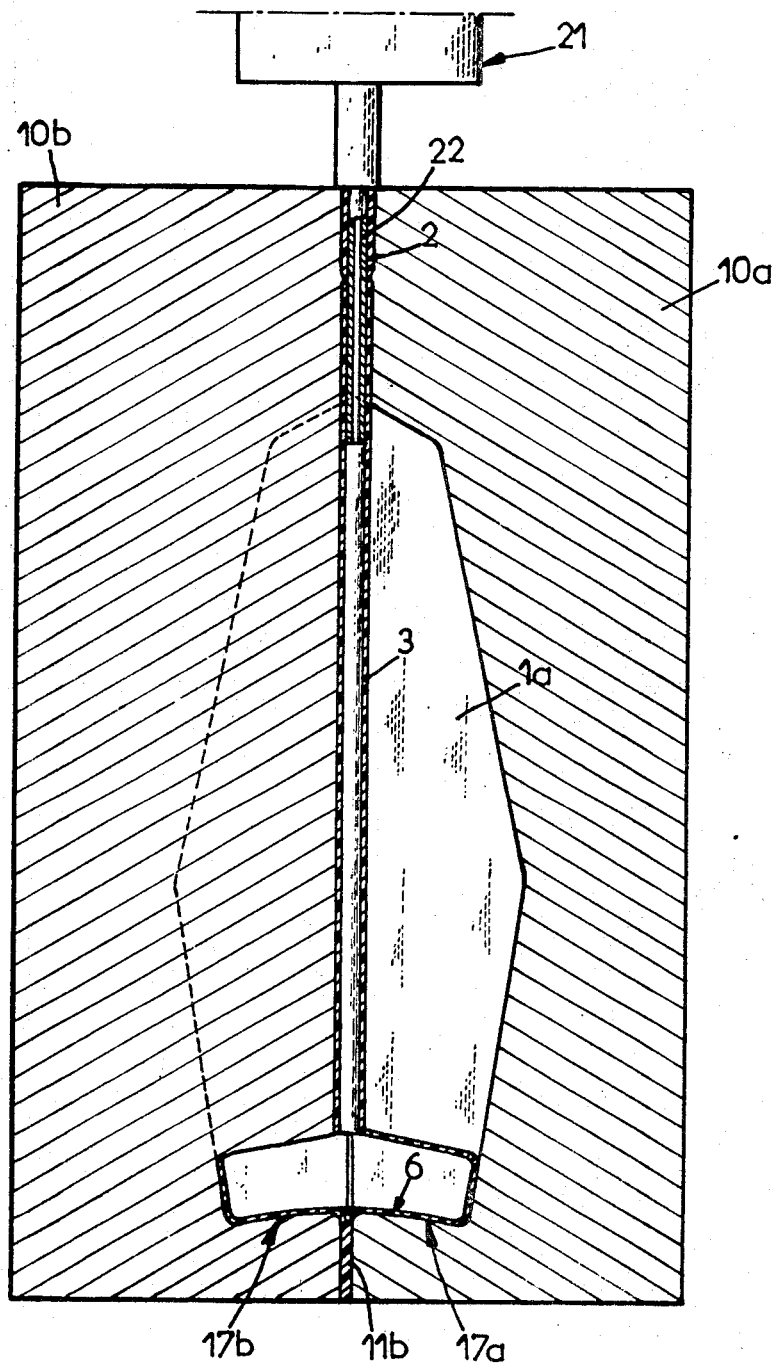

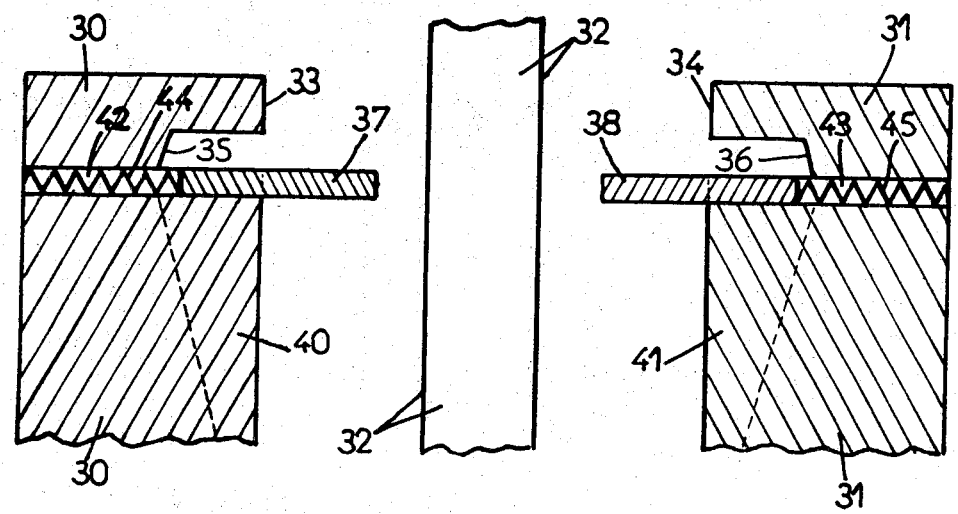
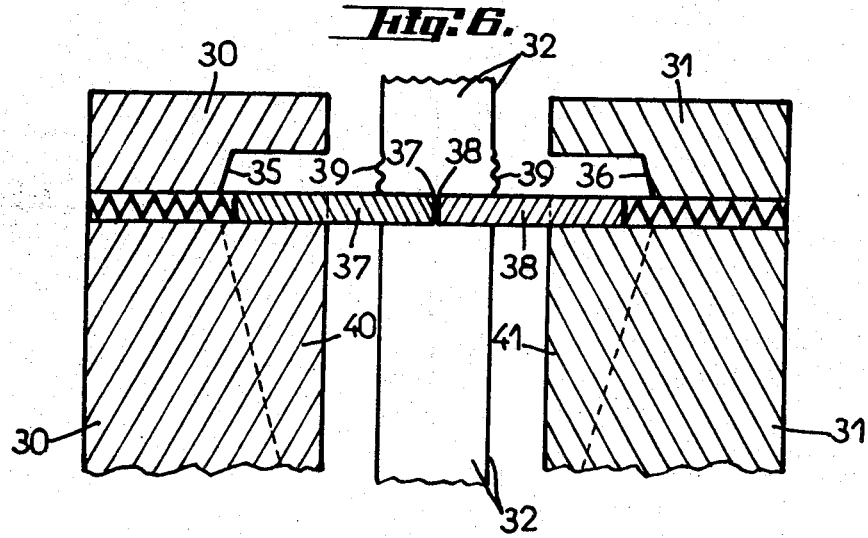
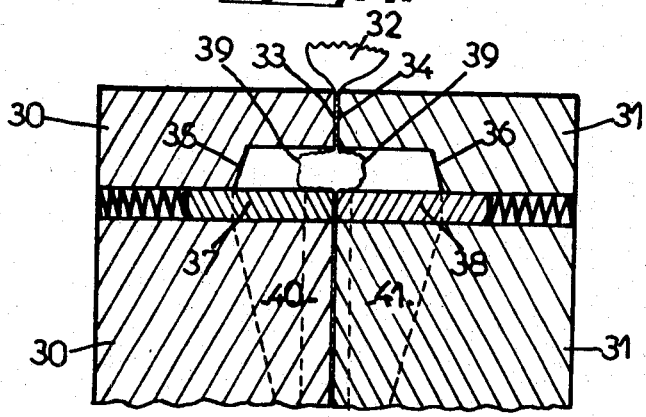

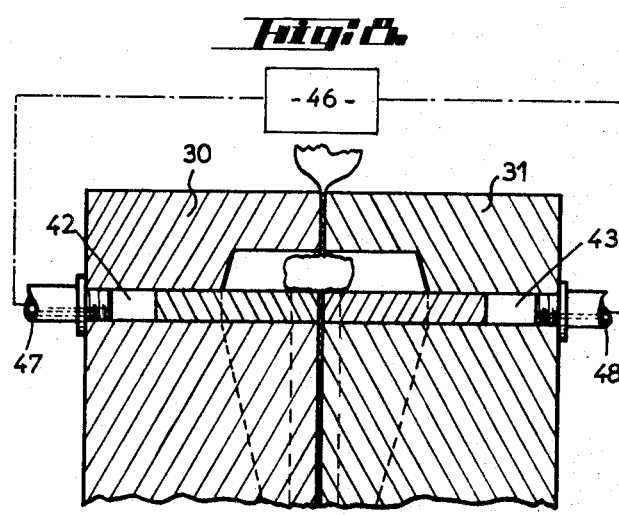

3,538,543
SHELL MOULD FOR MANUFACTURING HOLLOW PLASTIC MOULDINGS
Paul Nataf, 54 Rue de Sablonville, Neuilly-sur-Seine, Hauts-de-Seine, France
Original appplication Mar. 21, 1966, Ser. No. 535,875, now Patent No. 3,347,401, dated Oct. 17, 1967. Divided and this application June 26, 1967, Ser. No. 648,642
Claims priority, application France, Mar. 24, 1965, 10,512; June 5, 1965, 19,755
Int. Cl. B29c 1/00
U.S. Cl. 18—5
8 Claims

ABSTRACT OF THE DISCLOSURE

The mould comprises two shells, each one of said shells comprising an upper face forming a joint plane, a hollow portion, a first groove extending from the front edge of the shell to said hollow portion, a partition member in the hollow portion extending to a short distance from the bottom face of said hollow portion whereby said hollow portion is divided into two cavities communicating with each other. The partition member has an upper edge substantially level with said upper face and provided with a second groove communicating with said first groove. The mould further comprises a mandrel having an air fed hollow duct adapted to be received in said first groove.

This is an application divided from application Ser. No. 535,875 filed on Mar. 21, 1966, Pat. No. 3,347,401—Oct. 17, 1967.

Said application Ser No. 535,875 discloses and claims a container comprising a hollow body made of mouldable material, said hollow body having a bottom wall and being formed with at least two recesses welded to each other along at least two parallel weld lines, said recesses extending from the upper portion of said hollow body to a short distance from said bottom wall so as to divide said hollow body into at least two cavities communicating with each other at their lower portions, and an exhaust pipe comprising an outer section projecting from said upper portion of the hollow body and an inner section embedded in said hollow body and formed between said weld lines.

The present application specifically relates to a mould for manufacturing a hollow body by blowing, this mould comprising at least two shells or half-moulds adapted to retain therebetween the material constituting said hollow body and having for example the shape of an extruded tube.

According to a further feature of this invention, the aforesaid shells or half-moulds are provided with internal partitions extending to within a short distance of the corresponding portion of the bottom of the hollow body and adapted to contact each other along their edges, in the closed mould position, said edges being thus provided with grooves forming together a channel connecting the inner mold space with the exterior.

According to a complementary feature of this invention, each shell comprises, in addition, at least one groove, formed in the joint plane and forming, when the mould is closed, another channel communicating with the aforesaid channel formed by the grooves of said partitions.

Finally, this invention is characterized in that the channel formed by the two grooves formed in the joint planes of said shells is adapted to receive a mandrel comprising at least one hollow tube for introducing gas under pressure into the mould by means of the channel formed between said two partitions.

Other features and advantages of this invention will appear as the following description proceeds with reference to the attached drawings illustrating diagrammatically by way of example various forms of embodiment of the invention. In the drawings:

FIG. 1 is a perspective view showing a hollow body manufactured by means of a mould constructed according to the teachings of this invention, said hollow body being shown for illustrative purpose only.

FIG. 2 is a detail view showing one of the shells of a mould constructed according to the teachings of the invention, together with the mandrel associated with this mould;

FIG. 3 is a cross-sectional view of a mould consisting of two shells similar to the one shown in FIG. 2, this section being taken upon the line III—III of FIG. 2;

FIG. 4 is a section taken upon the line IV—IV of FIG. 3;

FIG. 5 is a diagrammatic fragmentary sectional illustration of a mould according to a modified form of embodiment of this invention, the two mould shells being somewhat spaced apart and disposed on either side of an extruded tube adapted to be moulded;

FIG. 6 illustrates the shells of the mould shown in FIG. 5 during their closing movement;

FIG. 7 illustrates the shells of the mould of FIG. 5 in their closed position;

FIG. 8 is a diagrammatic fragmentary sectional illustration of a mould according to a further modified form of embodiment of the invention, the two shells being in their closed portion.

The hollow body 1 illustrated in FIG. 1 is a bottle adapted to be filled with any desired beverage, for example fruit juice. It consists of heat-weldable plastic material such as polyethylene and comprises an exhaust pipe or nozzle including a projecting section 2 and an internal or embedded section 3 constituting the internal extension of said projection section 2, and communicating with the inner space of said hollow body. The internal section 3 of said pipe is disposed between two symmetric recesses 4 and 5 extending from the upper portion of the hollow body, i.e., from the base of the projecting pipe section 2, to a short distance (for example a few millimeters) from the bottom 6 of said hollow body.

These symmetric recesses 4 and 5 consist of two identical diametrally opposite cavities formed in the wall of the plastic bottle. The bottoms of these cavities or recesses are shaped to include a substantially semi-circular groove whereby these bottoms constitute the embedded or internal portion of the pipe when they are welded along two weld lines 7.

These recesses 4 and 5 divide the bottle 1 into two identical cavities 1a and 1b communicating with each other at their lower portions, that is, between the lower portion of the embedded pipe section 3 and the bottom 6 of the bottle.

The cavities 1a and 1b are provided at their upper portion with pipe or nozzle means 8a and 8b communicating with the surrounding atmosphere.

For sucking up the liquid content there is only to break the projecting pipe section 2 as well as the pipes 8a and 8b along the restricted portions 9 and then to exhaust the liquid content from the bottle.

FIG. 2 illustrates one of the two shells 10a constituting a mould according to this invention. This shell comprises an upper face 11a forming the joint plane and contacting in the closed mould position the registering face 11b of the associated shell 10b (see FIGS. 3 and 4). This shell 10a comprises a hollow portion cavity or impression 12a corresponding to the general configuration which it is desired to impart to the hollow body. A groove 13a for example of semi-circular cross-sectional contour extends from this cavity 12a and leads to the top face 14a of shell 10a. This groove 13a corresponds to the pipe 2 of bottle 1. The cavity 12a is divided into two identical recesses 15a and 16a by a partition 17a formed integrally with the shell and aligned with the aforesaid groove 13a. The upper edge of this partition 17a which, in the case illustrated, is substantially level with the joint plane 11a, comprises a groove 18a extending throughout its length and constitutes the extension of the aforesaid groove 13a. The thickness of said partition 17a increases from its edge to the bottom of the cavity 12a, so as to have an outflared shape corresponding to that of the recesses 4 and 5 of bottle 1.

Between each one of said cavities 15a and 16a and the top face 14a of the mould two grooves 19a and 20a disposed on either side of said groove 13a and symmetrically thereto are provided and correspond to the vent pipes 8a and 8b of the bottle.

There is also shown in FIG. 2 a mandrel 21 acting as an extrusion die to form the exhaust pipe and the vent pipes 8a and 8b. This mandrel comprises on the one hand a central tube 22 of a length slightly superior to that of the groove 13a and communicates with a gas feed pipe 23, and on the other hand two rods or like members 24 and 25. This pipe 23 and rods 24, 25 have a diameter slightly inferior to that of grooves 13a, 19a and 20a so as to leave a space sufficient for the plastic when the two mould shells are in their closed position.

FIGS. 3 and 4 illustrate in cross-sectional view and in longitudinal section, respectively, a complete mould for manufacturing by the blowing method a hollow plastic body according to this invention. This mould consists of two identical shells 10a and 10b, the same elements of these two shells being designated by the same reference numerals bearing the indices a and b, respectively. The two shells are disposed on either side of the plastic material constituting a double-walled structure, for example in the form of an extruded tubular sheet (not shown) but the central tube 22 and rods 24, 25 of mandrel 21 being disposed between the two walls of plastic material, for example internally of the extruded tube.

After having so disposed the mandrel that the tube 22 and rods 24, 25 register with grooves 13a, 13b; 19a, 19b and 20a, 20b, the two shells are moved towards each other to trap the plastic material therebetween.

The mandrel 21, with its tube 22 and rods 24, 25 disposed coaxially to the channels formed by the grooves 13a, 13b; 19a, 19b and 20a, 20b permits of forming by die-moulding the projecting pipe section 2 as well as the two vent pipes 8a and 8b of the hollow body.

After closing the mould, gas under pressure, for example air, is blown into same through the mandrel tube 22. This air under pressure drives the plastic material which is thus pinched between the edges of partitions 17a and 17b, whereby this material will take the shape of the grooves 18a and 18b and thus form the pipe section 3 embedded in the bottle 1. The air under pressure subsequently penetrates into the cavities 15a, 15b and 16a, 16b and forces the plastic material against the mould walls, thus giving the desired shape to the bottle. It will be seen that the die-moulding of the embedded pipe section 3 is produced by the compressed air issuing from the tube 22, instead of from the mandrel as in the case of the projecting pipe section 2 on the one hand, and vent pipes 8a, 8b, on the other hand.

Of course, the rods 24 and 25 could be replaced by pipes connected like the tube 22 to the air-pressure tube 23. On the other hand, the rods 24 and 25, or the pipes substituted therefor, if any, may have any desired and suitable diameter, for example equal to or greater than that of tube 22.

FIG. 5 illustrates a mould according to this invention which is designed for retaining in its portion forming the bottom of the hollow body a greater portion of plastic material in order to increase the thickness of the wall of this hollow body in the vicinity of its bottom. This mould, of which the shells or half-moulds are designated by the reference numerals 30 and 31, is shown in its operative position, according to one of the methods applicable thereto; in other words, its bottom is at the top and gas is introduced by blowing from the lower portion of the mould through means (not shown). The mould is disposed beneath an extrusion die (not shown) from which the extruded plastic tube 32 is lowered vertically. The reference numerals 33 and 34 designate the front faces of the lower portion of shells 30 and 31, numerals 40, 41 designating the partitions forming the integral pipe, and numerals 35, 36 designate the portions of shells 30 and 31 which constitute the bottom of the container.

The partitions 40 and 41 comprise, in the vicinity of the mould bottom, movable portions 37 and 38 slidably mounted in recesses 42 and 43 and urged by spring means 44 and 45 towards the exterior of said recesses, that is, to the position shown in FIGS. 5 and 6.

When the mould shells 30 and 31 are moved away from each other, the sliding portions 37 and 38 of partitions 40 and 41 are positioned as to project laterally towards each other and thus emerge from the front faces 33 and 34 of the shells.

FIG. 6 illustrates the beginning of the mould closing movement. The sliding portions 37 and 38 clamp therebetween the extruded tube 32 which continues to emerge from the extrusion die and therefore forms above these portions a "draping" 39 of extruded material.

FIG. 7 shows the mould shells 30 and 31 in their closed or assembled position, when they clamp between their registering front faces 33 and 34, the aforesaid tube 32. As the shell closing movement proceeds, the portions 37 and 38 slide in a direction opposite to that of shells 30 and 31 by engaging their relevant recesses until their ends contacting the extruded tube 32 are flush with said front faces 33 and 34.

During the second phase of the mould closing movement, that is, when the shells move from the position shown in FIG. 6 to the position shown in FIG. 7, the extruded tube portion 32 overlying the members 37 and 38 continues its downward movement so that an additional quantity of extruded material, as a consequence of the aforesaid raping effect, is trapped within the mold cavity. This excess material permits of obtaining a greater thickness in the bottom and lateral walls of the hollow body. The excess of extruded tube is squeezed between the front faces 33 and 34 of shells 30 and 31.

Hydraulic or preferably pneumatic means may be used for slidably driving the aforesaid members 37 and 38 instead of the springs illustrated in FIGS. 5 to 7. Said means, schematically shown in FIG. 8 and indicated by reference numeral 46, may consist of an air-compressor, and are connected to recesses 42 and 43 through ducts 47 and 48 respectively. Thus, an air-pressure cushion may be created behind these members 37 and 38 in order to hold them in the extended position corresponding to that shown in FIG. 5. As they move from the position corresponding to the beginning of the mould closing movement to the closed position shown in FIG. 8, these members 37 and 38 compress the air trapped in their relevant recesses. This pressure is released preferably before opening the mould to prevent the members 37 and 38 from prematurely emerging from their chambers as this might interfere with the stripping of the hollow body.

It should be noted that in the above-described form of embodiment the members 36 and 38 are mounted on partitions 40 and 41 respectively, assuming that the mould operates in the manner explained hereinabove, with its bottom at the top. Should the mould operate in the opposite position, that is, with the bottom down, it is obvious that these sliding members 37 and 38 should be carried not by said partitions 40 and 41 but by the lower portion of the mould, that is, the one of which the registering faces are designated by the reference numerals 33 and 34.

The hollow body illustrated in FIG. 1 comprises a projecting pipe section 2 and an embedded pipe section 3, both of which are rectilinear and in relative axial alignment. However, this specific arrangement is not compulsory. In fact, we have seen that the tube 22 of mandrel 21 serves the only purpose of extruding the projecting pipe section 2, the embedded pipe section 3 being extruded by the air under pressure delivered through the tube 22. Therefore, the use of a pipe rectilinear from end to end is not compulsory as it should be in case the extruding step were carried out by means of a rigid duct or a rigid rod extending throughout the suction pipe, that is, its projecting section 2 and its embedded section 3.

The edges of partitions 17a and 17b, instead of being level with the faces 11a and 11b of the half-moulds or shells, as shown, may be disposed differently; thus, any desired and suitable inclination may be imparted to these edges provided that it is consistent with the dimensions of the mould cavity 12a (FIG. 2), so that in this use the pipe section embedded in the bottle be somewhat inclined with respect to the projecting pipe section.

Of course, this invention should not be construed as being limited by the forms of embodiment described and illustrated herein which are given only by way of example.

What I claim is:

1. A mould for manufacturing a hollow body by blowing a mouldable material occurring in the form of an extruded tube comprising two shells adapted to trap therebetween said mouldable material, each shell comprising an upper face forming a joint plane, a front edge, a hollow portion having a front face and a bottom face, a first groove extending from said front edge to said front face, a partition member in said hollow portion extending from said front face to a short distance from said bottom face, whereby said hollow portion is divided into two cavities communicating with each other, said partition member having an upper edge substantially level with said upper face and provided with a second groove communicating with said first groove, at least one further groove extending from said front edge to one of said cavities, and a mandrel having an air fed hollow duct adapted to be received in said first groove and at least one rod member adapted to be received in said further groove.

2. A mould according to claim 1, wherein each shell comprises two of said further grooves, said further grooves being parallel to said first groove and disposed on either side thereof, said mandrel comprising two rod members adapted to be received in said further grooves.

3. A mould according to claim 1, wherein said partition members are provided at their ends facing said bottom face, with movable portions, projecting from said upper faces and adapted to register with each other and adapted to recede when they engage each other while pinching therebetween said mouldable material.

4. A mould according to claim 3, wherein each shell is provided with a recess for receiving said movable portion.

5. A mould according to claim 4, wherein said movable portion is slidably mounted in said recess.

6. A mould according to claim 5, wherein means are provided in said recesses for urging said movable members toward each other.

7. A mould according to claim 6, wherein means for urging said movable members comprise spring means.

8. A mould according to claim 6, wherein means for urging said movable members comprise hydraulic or pneumatic means.

References Cited

UNITED STATES PATENTS

| | | | |
|---|---|---|---|
| 3,048,891 | 8/1962 | Maass | 18—5 |
| 3,339,232 | 9/1967 | Battenfeld et al. | 18—5 |
| 3,372,429 | 3/1968 | Kato | 18—5 |
| 3,398,427 | 8/1968 | John | 18—5 |

H. A. KILBY, Jr., Primary Examiner

U.S. Cl. X.R.

164—94